(12) United States Patent
Beyer et al.

(10) Patent No.: US 10,830,057 B2
(45) Date of Patent: Nov. 10, 2020

(54) AIRFOIL WITH TIP RAIL COOLING

(71) Applicant: General Electric Company, Schenectady, NY (US)

(72) Inventors: Matthew Thomas Beyer, Hartland, WI (US); Gregory Terrence Garay, West Chester, OH (US); Aaron Ezekiel Smith, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 323 days.

(21) Appl. No.: 15/609,488

(22) Filed: May 31, 2017

(65) Prior Publication Data
US 2018/0347375 A1 Dec. 6, 2018

(51) Int. Cl.
*F01D 5/20* (2006.01)
*F01D 5/18* (2006.01)

(52) U.S. Cl.
CPC .............. *F01D 5/187* (2013.01); *F01D 5/20* (2013.01); *F05D 2240/307* (2013.01); *F05D 2260/201* (2013.01); *F05D 2260/202* (2013.01)

(58) Field of Classification Search
CPC .......... F01D 5/187; F01D 5/225; F01D 5/186; F01D 5/20; F05D 2220/30; F05D 2220/32; F02C 3/04
See application file for complete search history.

(56) References Cited

U.S. PATENT DOCUMENTS

| | | | |
|---|---|---|---|
| 5,660,523 A | 8/1997 | Lee | |
| 6,164,914 A | 12/2000 | Correia et al. | |
| 6,494,678 B1 * | 12/2002 | Bunker | F01D 5/18 415/115 |
| 6,527,514 B2 * | 3/2003 | Roeloffs | F01D 5/186 416/97 R |
| 6,994,514 B2 | 2/2006 | Soechting et al. | |
| 7,351,035 B2 * | 4/2008 | Deschamps | F01D 5/20 416/92 |
| 7,473,073 B1 | 1/2009 | Liang | |
| 7,510,376 B2 * | 3/2009 | Lee | F01D 5/20 416/97 R |
| 7,597,539 B1 * | 10/2009 | Liang | F01D 5/186 416/97 R |
| 7,632,062 B2 * | 12/2009 | Harvey | F01D 5/20 415/115 |
| 7,695,248 B2 * | 4/2010 | Mons | B23K 26/147 416/97 R |

(Continued)

FOREIGN PATENT DOCUMENTS

CN 105179022 A 12/2015

OTHER PUBLICATIONS

Chinese Patent Office, Office Action re Corresponding Application No. 201810548652.7, dated Apr. 22, 2020, 8 pages, China.

*Primary Examiner* — Gonzalo Laguarda
(74) *Attorney, Agent, or Firm* — McGarry Bair PC

(57) ABSTRACT

An apparatus and method for cooling an airfoil tip for a turbine engine can include an airfoil, such as a cooled turbine blade, having a tip rail extending beyond a tip wall enclosing an interior for the airfoil at the tip. A plurality of cooling holes can be provided in the tip rail at the tip. A flow of cooling fluid can be provided through the cooling holes from the interior of the airfoil to cool the tip of the airfoil.

17 Claims, 6 Drawing Sheets

(56) References Cited

U.S. PATENT DOCUMENTS

| | | | |
|---|---|---|---|
| 7,740,445 B1* | 6/2010 | Liang | F01D 5/187 415/173.5 |
| 8,043,059 B1 | 10/2011 | Liang | |
| 8,061,987 B1* | 11/2011 | Liang | F01D 5/186 416/92 |
| 8,066,485 B1* | 11/2011 | Liang | F01D 5/186 415/115 |
| 8,075,268 B1 | 12/2011 | Liang | |
| 8,172,507 B2 | 5/2012 | Liang | |
| 8,182,221 B1 | 5/2012 | Liang | |
| 8,313,287 B2* | 11/2012 | Little | F01D 5/187 415/173.1 |
| 8,414,265 B2* | 4/2013 | Willett, Jr. | F01D 5/20 416/228 |
| 8,777,572 B2* | 7/2014 | Cheong | F01D 5/20 415/115 |
| 9,328,617 B2 | 5/2016 | Gautschi et al. | |
| 9,879,544 B2* | 1/2018 | Waldman | F01D 5/20 |
| 2005/0232771 A1 | 10/2005 | Harvey et al. | |
| 2012/0070307 A1* | 3/2012 | Poon | F01D 5/20 416/97 R |
| 2017/0089206 A1* | 3/2017 | Quach | F01D 5/187 |

\* cited by examiner

AIRFOIL WITH TIP RAIL COOLING

BACKGROUND OF THE INVENTION

Turbine engines, and particularly gas or combustion turbine engines, are rotary engines that extract energy from a flow of combusted gases passing through the engine onto a multitude of rotating turbine blades, and in some cases, such as aircraft, generate thrust for propulsion.

Gas turbine engines for aircraft are designed to operate at high temperatures to maximize engine efficiency, so cooling of certain engine components, such as a high pressure turbine and a low pressure turbine, can be beneficial. Typically, cooling is accomplished by ducting cooler air from high and/or low pressure compressors to the engine components that require cooling. Temperatures in the high pressure turbine can be 1000° C. to 2000° C. and the cooling air from the compressor can be 500° C. to 700° C., enough of a difference to cool the high pressure turbine.

Contemporary turbine blades, as well as vanes or nozzles, generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

In one aspect, the disclosure relates to an airfoil comprising an outer wall bounding an interior and defining a pressure side and a suction side extending between a leading edge and a trailing edge to define a chord-wise direction and extending between a root and a tip to define a span-wise direction, a tip rail projecting from the tip in the span-wise direction where at least a portion of the tip rail is a thickened portion wider than the outer wall at a junction of the tip rail with the tip, and at least one cooling hole with an inlet communicating with the interior, an outlet within the thickened portion on the tip rail, and a channel fluidly coupling the inlet to the outlet.

In another aspect, the disclosure relates to an engine component for a turbine engine comprising a tip having a tip rail projecting from the tip to define a span-wise direction and at least a portion of the tip rail is a thickened portion wider than a width of the tip rail at the tip and at least one cooling hole having an inlet communicating with an interior of the engine component and a channel connecting the inlet to an outlet on the tip rail within the thickened portion.

In yet another aspect, the disclosure relates to a method of cooling a tip of an airfoil, the method comprising supplying a cooling fluid through a cooling channel from an interior of the airfoil to a thickened portion of a tip rail, and emitting the cooling fluid through an outlet in the thickened portion.

DETAILED DESCRIPTION OF THE INVENTION

Figure 1:
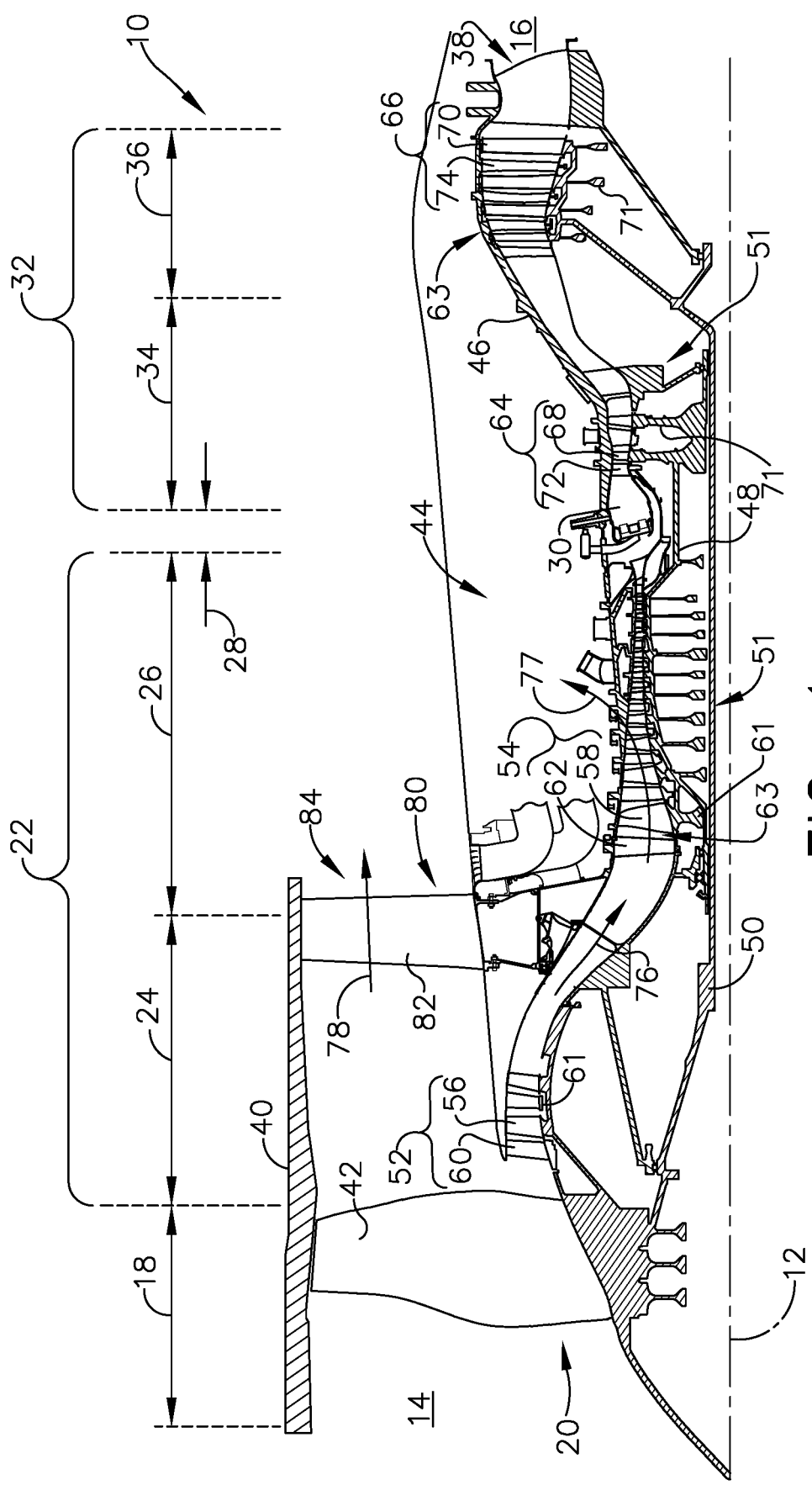
FIG. 1 is a schematic cross-sectional diagram of a portion of a turbine engine for an aircraft.

Aspects of the disclosure described herein are directed to a tip of an airfoil including cooling holes having outlets formed in at least a portion of a flared portion at a tip rail of the tip. For purposes of illustration, the present disclosure will be described with respect to a blade for a turbine in an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference. A "set" as used herein can include any number of a particular element, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a portion of a gas turbine engine 10 for an aircraft. The engine 10 has a longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12 and rotatable within the fan casing 40. The HP compressor 26, the combustor 30, and the HP turbine 34 form a core 44 of the engine 10, which generates and extracts energy from combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and are ultimately discharged from the engine 10 via the exhaust section 38. The driving of the LP turbine 36 drives the LP spool 50 to rotate the fan 20 and the LP compressor 24.

A portion of pressurized airflow 76 generated in the compressor section 22 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of airflow 78 from the fan section 18 bypasses the LP compressor 24 and engine core 44 and exits the engine assembly 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 is utilized adjacent the fan section 18 to exert some directional control of the airflow 78.

The airflow 78 can be a cooling fluid used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
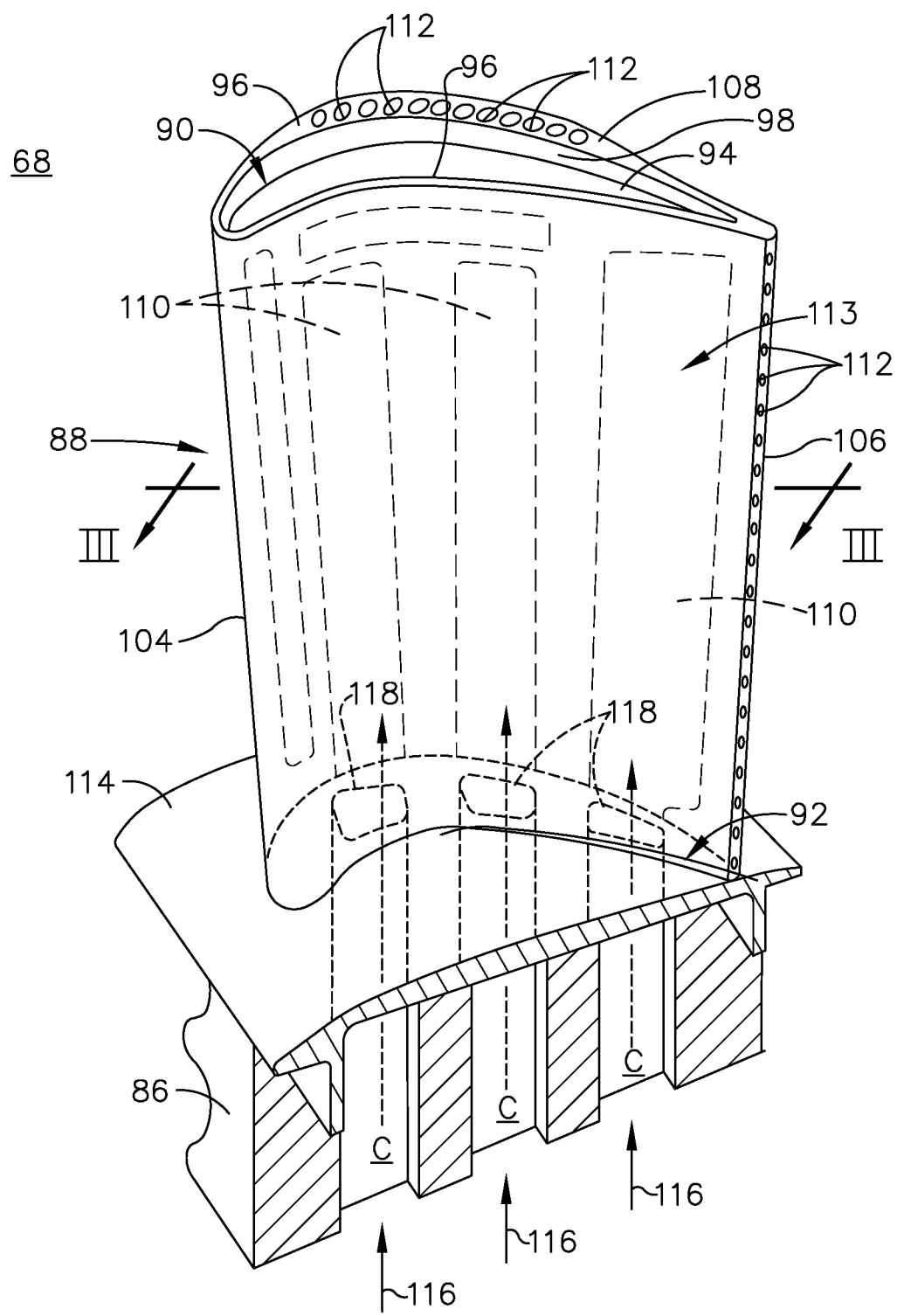
FIG. 2 is an isometric view of an airfoil of the engine of FIG. 1 including a tip with cooling holes.

Referring to FIG. 2, an engine component in the form of one of the turbine blades 68 includes a dovetail 86 and an airfoil 88. The airfoil 88 includes a tip 90 and a root 92 defining a span-wise direction therebetween. A tip wall 94 is provided at the tip 90, with a tip rail 96 having an interior surface 98 and extending from the tip wall 94. The airfoil 88 further includes a leading edge 104 and a trailing edge 106 defining a chord-wise direction therebetween. The tip rail 96 circumscribes the airfoil 88 and includes a thickened portion 108. A plurality of cooling holes 112 are provided at the tip 90 within the thickened portion 108. It is also contemplated that cooling holes 112 can be provided in the span-wise direction along the trailing edge 106 of the airfoil 88. The blade 68 can include multiple interior cooling passages 110. The cooling passages 110 can fluidly couple to one or more other cooling passages 110 or features formed within the airfoil 88, by way of non-limiting example the cooling holes 112, to define one or more cooling circuits 113.

The airfoil 88 mounts to the dovetail 86 by way of a platform 114 at the root 92. The platform 114 helps to radially contain a turbine engine mainstream airflow driven by the blade 68. The dovetail 86 can be configured to mount to the turbine rotor disk 71 on the engine 10 to drive the blade 68. The dovetail 86 further includes at least one inlet passage 116, with the exemplary dovetail 86 shown as a having three inlet passages 116. The inlet passages 116 extend through the dovetail 86 and the platform 114 to provide internal fluid communication with the airfoil 88 at corresponding passage outlets 118. Each of the passage outlets 118 can be fluidly coupled to one or more of the internal cooling passages 110. It should be appreciated that the dovetail 86 is shown in cross-section, such that the inlet passages 116 are enclosed within the body of the dovetail 86. A flow of cooling fluid C, such as airflow 77 and/or airflow 78 can be provided to the airfoil 88 through the inlet passage 116 exhausting at the passage outlets 118.

Figure 3:
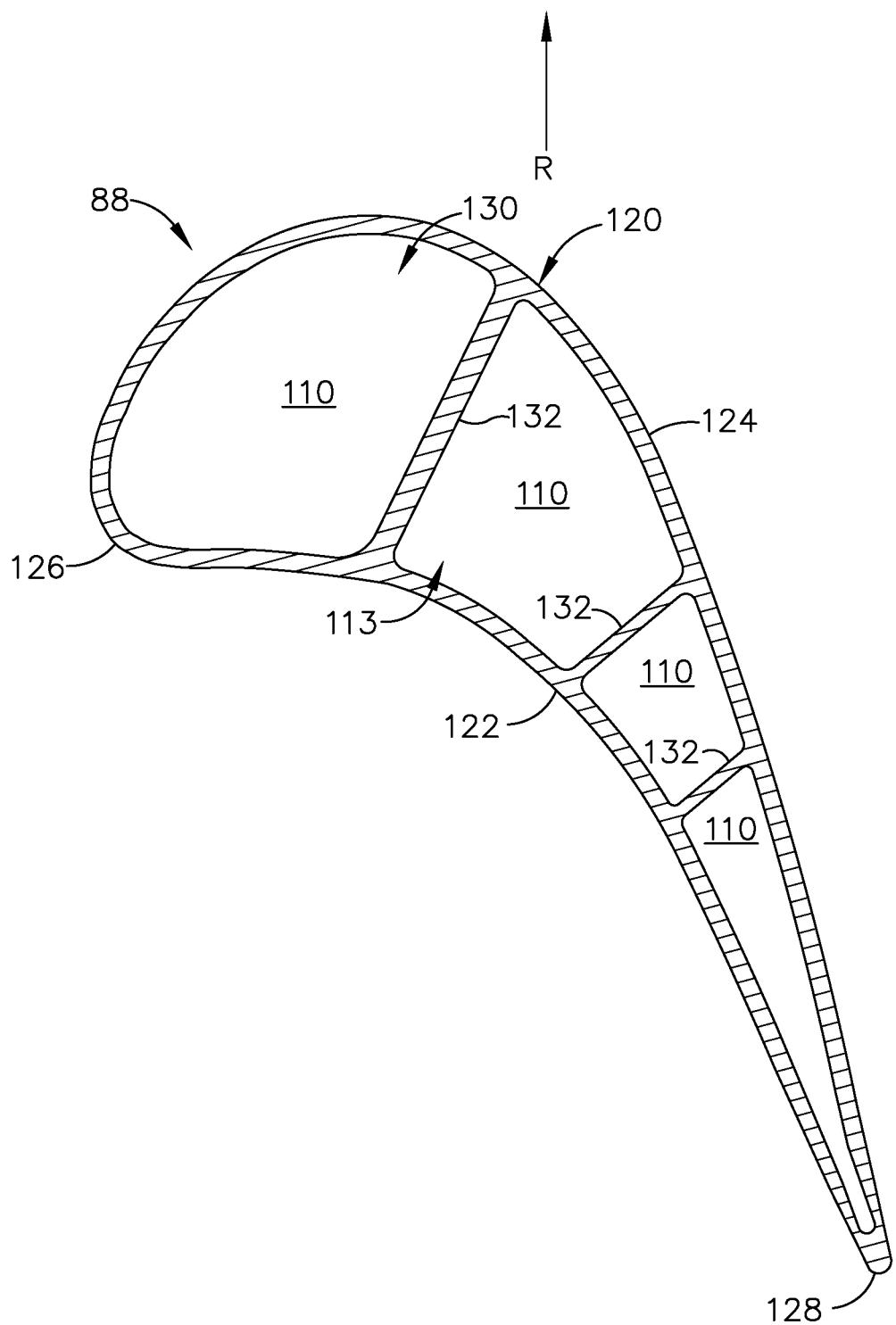
FIG. 3 is section view of the airfoil of FIG. 2 taken across section illustrating cooling passages within the airfoil.

Referring now to FIG. 3, the airfoil 88 includes an outer wall 120 comprising a concave-shaped pressure side 122 and a convex-shaped suction side 124 joined together to define the airfoil shape for the airfoil 88. During operation, the airfoil 88 rotates in a direction such that the pressure side 122 follows the suction side 124. Thus, as shown in FIG. 3, the airfoil 88 would rotate upward toward the top of the page as depicted by arrow R.

An interior 130 is defined by the outer wall 120. One or more interior walls shown as ribs 132 can divide the interior 130 into the multiple cooling passages 110. It should be appreciated that the interior structure of the airfoil 88 is exemplary as illustrated. The interior 130 of the airfoil 88 can be organized in a myriad of different ways, and the cooling passages 110 can include single passages extending in the span-wise direction, or can be complex cooling circuits, having multiple features such as passages, channels, inlets, outlets, ribs, pin banks, circuits, sub-circuits, film holes, plenums, mesh, turbulators, or otherwise in non-limiting examples. Preferably, the cooling passages 110 will be in fluid communication with the inlet passages 116 (FIG. 2). At least one of the cooling passages 110 is in fluid communication with the cooling holes 112.

Figure 4:
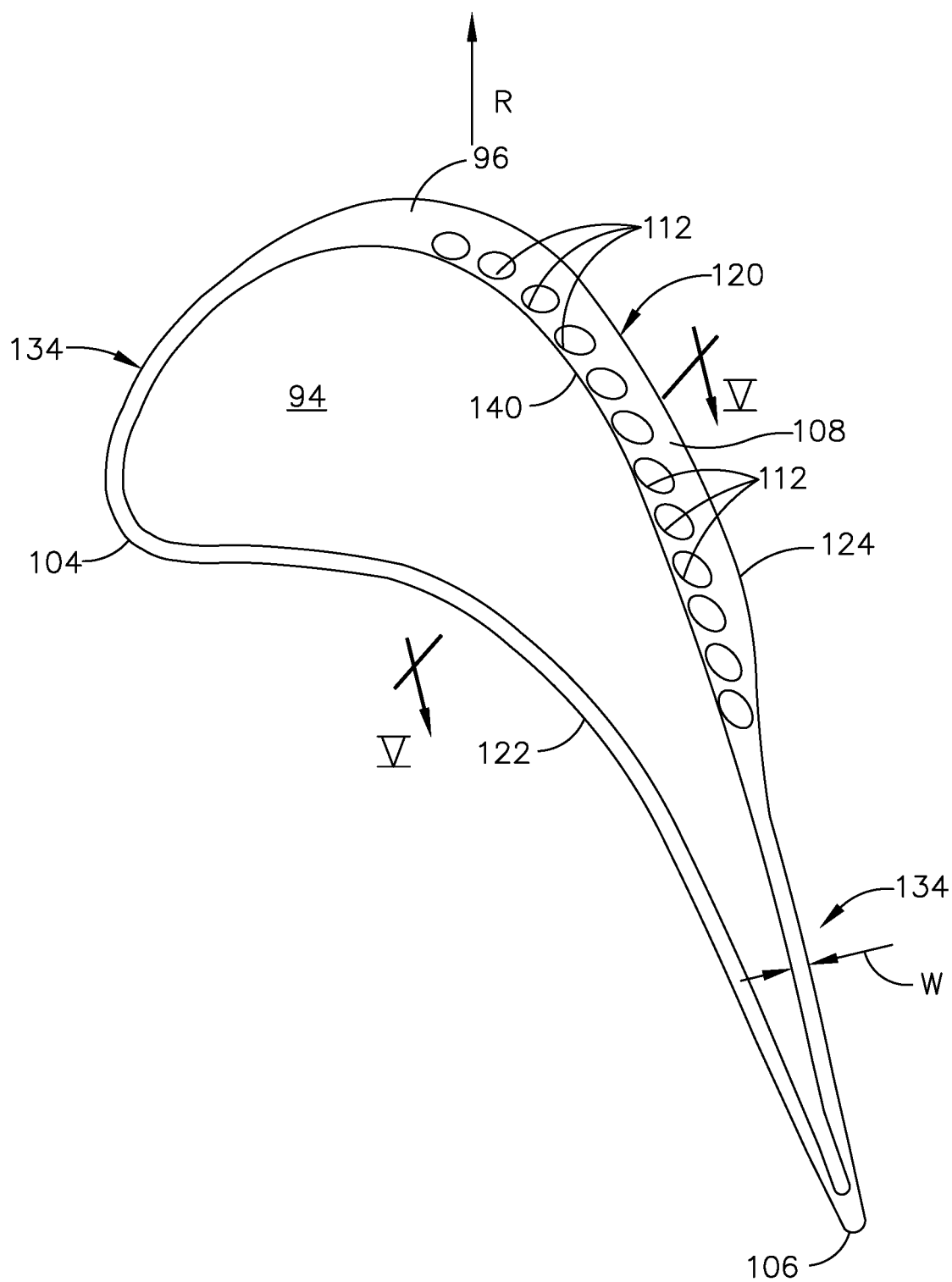
FIG. 4 is a top view of the tip of the airfoil from FIG. 2.

Referring now to FIG. 4, a top view of the airfoil 88 more clearly illustrates the thickened portion 108 of the tip rail 96. The thickened portion 108 can be provided on the suction side 124 at the tip 90. It is further contemplated that the thickened portion 108 is provided on the pressure side 122 or both on the suction side wall 124 and the pressure side 122. The location of the thickened portion 108 is for illustrative purposes only and not meant to be limiting. The thickened portion 108 can extend from the leading edge 104 to the trailing edge 106 generally in a chord-wise direction, by way of non-limiting example the thickened portion 108 can extend along only part of the suction side 124 as illustrated or the entire suction side 124. The thickened portion 108 is wider than a width W of the outer wall 120. The thickened portion 108 has a width of at least 2W, and can be up to 6W. At least one gradual sloped area 134 extends from the trailing edge 106 to the thickened portion 108 to provide a smooth transition from the width W of the tip rail 96. As illustrated, two gradual sloped areas 134 are provided, one between the trailing edge 106 and the thickened portion 108 and one between the leading edge 104 and the thickened portion 108. It is contemplated that the sloped areas 134 can be gradually sloped or steeply sloped depending on the aerodynamic limitations and/or functions of the blade 68.

The cooling holes 112, illustrated as a plurality of cooling holes, are provided at the tip 90 within the thickened portion 108. Each of the cooling holes 112 is provided at a location within the thickened portion 108 proximate the side 140 of the tip rail 96 furthest from the direction of rotation (top of the page in the illustration). While illustrated as provided on the suction side 124, it is also contemplated that the plurality of cooling holes 112 can be on the pressure side 122.

Figure 5:
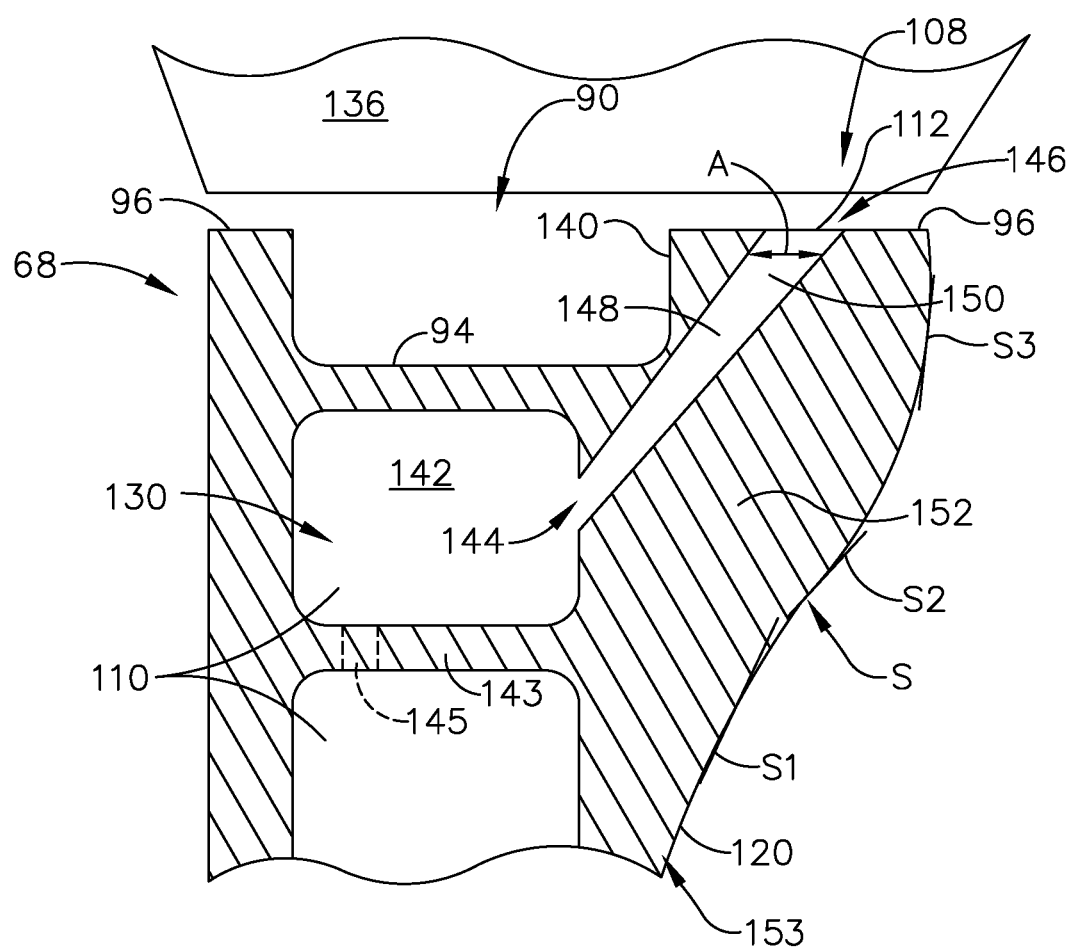
FIG. 5 is a cross-sectional view of the airfoil taken along line V-V of FIG. 4.

A cross-section of the airfoil 88 is depicted in FIG. 5 as cut along line V-V of FIG. 4. The blade 68 can be located radially below a shroud segment 136. The shroud segment 136 can be a plurality of shroud segments 136 circumferentially arranged around the blades 68. A plenum 142 located in the interior 130 proximate the tip 90 and below the tip wall 94 can be part of the cooling circuit 113. The plenum 142 can be defined by an interior rib 143 and be fluidly coupled with at least one cooling passage 110 at an interior hole 145. The plenum 142 can be by way of non-limiting example, a tip passage defining a cooling passage 110 radially inward from the tip wall 94. The plenum 142 is fluidly coupled to at least one of the cooling holes 112 at an inlet 144. The cooling holes 112 include an outlet 146 and a channel 148 connecting the inlet 144 to the outlet 146. The channel 148 can include a diffusing section 150 at the outlet 146 where a cross-sectional area A of the channel 148 becomes increasingly large and the outlet 146 comprises an oblong shape, by way of non-limiting example an oval.

The tip rail 96 can include a flared portion 152 extending from the outer wall 120 at a junction 153 of the tip rail 96 with the tip 90 to define the thickened portion 108. It is contemplated that the flared portion 152 extends from the outer wall 120 with a slope S having varying gradients with a steep initial slope S1, a gradual secondary slope S2, and a steep final slope S3. It is further contemplated that the slope S is constant such that the flared portion 152 has a triangular shape in cross-section. It should be understood that the shape and slope of the flared portion can vary and that the description herein is for illustrative purposes only and not meant to be limiting.

Figure 6:
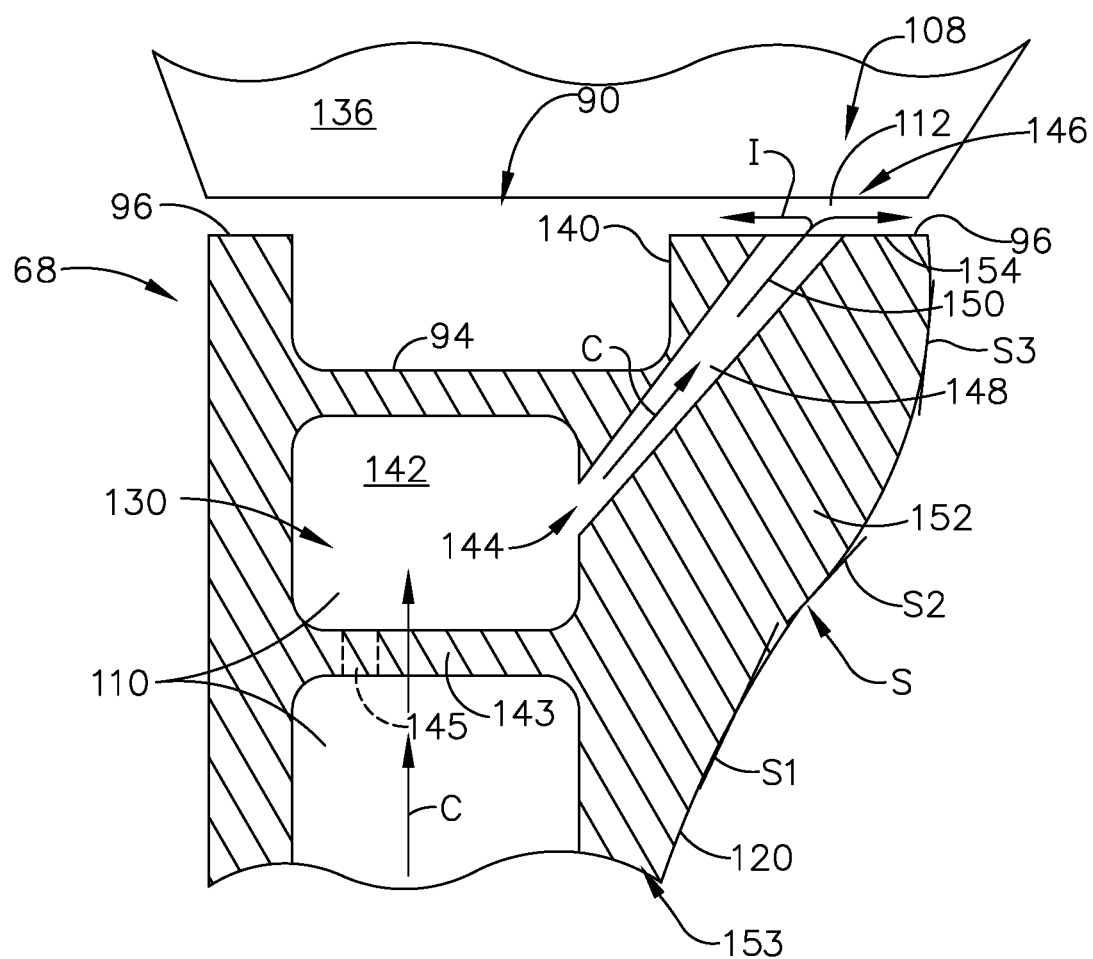
FIG. 6 is the cross-sectional view of FIG. 5 illustrating a method of cooling the tip of the airfoil.

Turning to FIG. 6 a method of cooling a tip of an airfoil is illustrated. For clarity some numerals have been removed from FIG. 6 that are present in FIG. 5. The method includes supplying a cooling fluid C through the cooling channel 148 from the interior 130 of the airfoil 88 to the thickened portion 108 of the tip rail 96. The method further includes emitting the cooling fluid C through the outlet 146 in the thickened portion 108. The method can also include impinging the cooling fluid C onto the shroud segment 136 to cool the shroud segment 136 by producing an impingement film I between the blade 68 and the shroud segment 136. The impingement film I can also cool the thickened portion 108.

It is further contemplated that the thickened portion 108 defines a radial maximum extent for the airfoil 88 and is a wear surface 154. During operation, the blade 68 may brush, bump, or otherwise contact the shroud segment 136. The thickened portion 108 provides the wear surface 154 in such an instance and provides longevity to the blade 68 life. The wear surface 154 can be considered the entire surface of the thickened portion 108. The cooling holes 112 are formed nearer to the side 140 to minimize damage to the cooling holes 112 in the event of contact with the shroud segment 136. Additionally the diffusing section 150 minimizes cooling hole blockage in the event of contact with the shroud segment 136.

The thickened portion of the tip rail improves durability due to extra thickness while additionally acting as an aero fin for performance improvement. The thickened portion acting as an aero fin eliminates the square edge and rapid expansion of the air over the rail, and therefore reduces the pressure differential across the rail. Ejecting holes along tip surface can also provide an aero seal. The ejection holes provide a disruption by flowing air perpendicular to the air passing over the tip. This air disruption inhibits the airflow over the tip and therefore reduces the flow loss over the tip. In addition, the holes provide bore cooling to rail, which is the convective flow along the side walls of the cooling hole along the covered length. Bore cooling is a very efficient and reliable heat transfer mechanism, and holes can be shaped to increase surface area, improve rub tolerance, and reduce heat load. Bore cooling through the rail improves heat transfer performance over traditional tip plenum dilution cooling.

Traditionally cooling of the suction side is difficult, providing a thickened portion with a plurality of cooling holes improves cooling in this area. Providing cooling holes at the tip along the thickened portion also cools the shroud segment adding a secondary benefit. Providing impingement at the tip along the thickened portion also acts as an aero seal and improves leakage over the tip.

Because the cooling fluid impinges on the shroud segment an additional cooling benefit for that component of the engine is provided. The robust thickened portion with cooling holes provides more efficient cooling of the suction side of the tip rail which therefore requires less cooling flow than without the cooling holes at the thickened portion. This improves durability and specific fuel consumption simultaneously.

Extra thickness in the tip rail provides durability improvement and ruggedization in the event of contact with the shroud segment. The diffuser shape of the cooling holes resists closure in the event of rubbing. The diffuser shape also increases surface area for cooling and reduces amount of material in the tip rail, reducing weight and cooled mass. Fluidly coupling the cooling holes to the plenum enables a high angle cooling channel and better bore cooling.

Aspects of the disclosure discussed herein are towards cast cooling holes at the tip of an airfoil that promote heat transfer and film cooling delivery to both the suction side of a blade and shroud segments proximate to the blade tip. Drilling, investment casting, or additive manufacturing are exemplary methods of forming the cooling holes described herein. It should be understood that other methods of forming the cooling holes described herein are also contemplated and that the methods disclosed are for exemplary purposes only.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil comprising:
    an outer wall bounding an interior and defining a pressure side wall and a suction side wall and a tip wall extending between a leading edge and a trailing edge to define a chord-wise direction and extending between a root and the tip wall to define a span-wise direction;
    a tip rail projecting from the tip wall on both the pressure side and the suction side in the span-wise direction where at least a portion of the tip rail on the suction side is a thickened portion that is wider than the outer wall at a junction of the tip rail with the tip wall and defines a flared portion extending from the suction side wall in the span-wise direction; and
    at least one cooling hole with an inlet communicating with the interior, an outlet formed in a plane defined by a top of the tip rail within the thickened portion, and a continuous channel fluidly coupling the inlet to the outlet.

2. The airfoil of claim 1 wherein the cooling hole comprises a diffusing section at the outlet.

3. The airfoil of claim 1 wherein the tip rail has an outer wall width and at least a portion of the tip rail is a thickened portion wider than the width of the outer wall.

4. The airfoil of claim 1 further comprising a plenum located within the interior and the inlet is fluidly coupled to the plenum.

5. The airfoil of claim 4 wherein the plenum is a cooling passage located adjacent the tip rail.

6. The airfoil of claim 1 wherein the thickened portion defines a radial maximum extent for the airfoil and defines a wear surface.

7. The airfoil of claim 6 wherein the outlet is located proximate a side of the tip rail furthest from the outer wall in the direction of rotation.

8. The airfoil of claim 1 wherein a width of the tip rail is twice that of a width of the outer wall at the junction.

9. An engine component for a turbine engine comprising:
    an outer wall having a width and defining a pressure side wall and a suction side wall and a tip wall;
    the tip wall having a tip rail defining at least a portion of the outer wall, the tip rail projecting from the tip wall on both the pressure side and the suction side to define a span-wise direction with at least a portion of the tip rail on the suction side defining a thickened portion wider than the width of the outer wall at the tip wall and defining a flared portion extending from the suction side wall in the span-wise direction; and
    at least one cooling hole having an inlet communicating with an interior of the engine component and a continuous channel connecting the inlet to an outlet located within a plane at a top of the tip rail within the thickened portion.

10. The engine component of claim 9 wherein the cooling hole comprises a diffusing section at the outlet.

11. The engine component of claim 9 further comprising a plenum located within the interior and the inlet is fluidly coupled to the plenum.

12. The engine component of claim 11 wherein the plenum is a cooling passage located adjacent the tip rail.

13. The engine component of claim 9 wherein the thickened portion defines a radial maximum extent for the airfoil and defines a wear surface.

14. The engine component of claim 13 wherein the outlet is located proximate a side of the tip rail furthest from the outer wall in the direction of rotation.

15. A method of cooling a tip wall of an airfoil having a tip rail extending from the tip wall on both a suction side wall and a pressure side wall of the airfoil, the tip rail located radially below a shroud segment, the method comprising:
    supplying a cooling fluid through a continuous cooling channel from an interior of the airfoil to a thickened portion of the tip rail defining a flared portion extending from the suction side wall of the airfoil; and
    emitting the cooling fluid through an outlet located on a plane facing the shroud segment and defined by the tip rail and in the thickened portion.

16. The method of claim 15 further including impinging the cooling fluid onto the shroud segment to cool the shroud segment.

17. The method of claim 16 wherein the impinging the cooling fluid includes cooling the thickened portion.

* * * * *